United States Patent [19]

Trapp

[11] Patent Number: 5,280,477
[45] Date of Patent: Jan. 18, 1994

[54] NETWORK SYNCHRONOUS DATA DISTRIBUTION SYSTEM

[75] Inventor: Timothy J. Trapp, Great Falls, Va.

[73] Assignee: E-Systems, Inc., Dallas, Tex.

[21] Appl. No.: 929,920

[22] Filed: Aug. 17, 1992

[51] Int. Cl.⁵ ............................ H04J 3/02; H04J 3/24
[52] U.S. Cl. .................................. 370/85.1; 370/94.1;
    370/857; 370/92; 340/825.47
[58] Field of Search .................. 370/85.1, 85.13, 96.1,
    370/96.2, 93, 85.5, 92, 85.7, 29; 340/825.47,
    825.07, 825.08, 825.03, 825.44, 825.47, 825.52,
    825.53

[56]         References Cited
         U.S. PATENT DOCUMENTS

| 4,759,015 | 7/1988 | Takai et al. | 370/85.7 |
| 4,764,920 | 8/1988 | Furuya | 370/94 |
| 4,792,947 | 12/1988 | Takiyasu et al. | 370/86 |
| 4,933,938 | 6/1990 | Sheehy | 370/86 |
| 5,136,580 | 8/1992 | Videlock et al. | 370/60 |

*Primary Examiner*—Douglas W. Olms
*Assistant Examiner*—Huy D. Vu
*Attorney, Agent, or Firm*—Rogers & Killeen

[57]         ABSTRACT

A method and apparatus for communicating synchronous and asynchronous data among multiple devices which are connected by a common network or a set of connected networks using a network communications protocol which provides deterministic, bounded latency. Transmitting and receiving devices communicate asynchronous data signals using data packets in accordance with the communications protocol in use by the system. If synchronous data signals must be communicated between two devices the transmitting device sends asynchronous data signals to the receiving device(s) to indicate that synchronous data will follow, and to inform the receiving device(s) of the transmitting device's address. The receiving device sets up a message filter which looks for and accepts data packets bearing a destination address field value equal to the address of the transmitting device. The transmitting device converts the synchronous data into one or more data packets bearing a destination address field value equal to the transmitting device's own address, and transmits the data packets over the network. The receiving device receives the data packets and reassembles them back into a synchronous data signal. Optionally, the transmitting and receiving devices may bypass normal error checking routines when communicating synchronous data. If multiple receiving devices are to receive the same synchronous data signal, they can each configure a filter to receive the synchronous data packets bearing the transmitting device's address in the destination address field. Thus, the transmitting device needs to send the data packets only one time, rather than sending duplicate data packets to several receiving devices.

7 Claims, 9 Drawing Sheets

FIG. 9

NETWORK SYNCHRONOUS DATA DISTRIBUTION SYSTEM

BACKGROUND OF THE INVENTION

The present invention relates, generally to systems for communicating data among remote devices, and in particular to a method and apparatus for communicating synchronous and asynchronous data between devices connected to a network or a group of interconnected networks.

Computer networks provide a way to exchange data between connected devices. The connected devices can be high speed digital computers, microprocessor based computers, simple recording devices, or a variety of other devices. Connecting multiple devices by a network and allowing the devices to exchange data eliminates the need for duplicate data storage, reduces costs, and increases productivity.

Many such network systems have been developed. They use different connection architectures, have different communications protocols, and can use either twisted pair wires, coaxial cables, optical fibers, or other physical transmission medium. Examples of common network systems are so called "local area network" systems which commonly interconnect plural "personal" computers.

In a network system, comprising plural end-user devices interconnected by a transmission medium, communications are frequently in the form of bit-serial data packets of a predetermined format. Each data packet usually contains a source address, a destination address, various supervisory or administrative data and, up to a predetermined amount of message data. An end-user device desiring to send a message to another end-user device typically accesses the transmission medium through interface units and causes the message to be communicated on the transmission medium where it is available to be received by the other end-user devices connected to the transmission medium. Because the length of a "message" may exceed the length available in a packet, the "message" may be broken into plural serial signals each of which are transmitted in one of the data packets. To transmit data the end user device passes the data packets to the interface unit, which in turn transmits the data along the transmission path after it has determined that the transmission path is not in use. An end-user device desiring to receive the data accesses the transmission medium through interface units and obtains the desired data packets therefrom. Typically, the end-user device must re-assemble message data from plural packets to reconstruct the original message.

In any data communication, and especially in data communications networks, it is common for the transmitting device and the receiving device to engage in a protocol which controls the communications process. Typically the transmission medium interface stage does not attempt to decode or sort the data packets in order to ensure message validity but utilizes network applied check words to determine data packet integrity. If the receiving device receives a message which is correct in format, and passes the network check word tests, the receiving device may send a message to the transmitting device acknowledging receipt of a valid data packet. Likewise, if the data fails to conform to the required format, or fails a check word test, the receiving device may send a non-acknowledgment message, or send no acknowledgement back to the transmitting device. If the transmitting device fails to receive acknowledgment that a valid data packet was received, it will re-transmit the packet.

The capability of such known communications systems is necessarily limited by the bandwidth of the transmission medium. When the number of devices communicating on the transmission medium exhausts the bandwidth capability of the system, no additional devices can be connected to the system, nor can the existing devices increase their message rates.

Since only one device at a time can transmit over the transmission path, if one device takes control of the network and sends a large amount of data, all the other devices must wait. Likewise, if many devices are all attempting to send data at the same time, each connected device must wait its turn. This can lead to unacceptable transmission delays unless some scheme exists to allocate use of the transmission medium.

There are many known methods of allocating access to the transmission medium. The network protocol can be such that the connected devices take turns transmitting. In such a system only one device at a time will have the privilege of transmitting, while all other devices can only receive. The privilege is passed from one device to another in a predefined order until each connected device has had an opportunity to transmit. Once the privilege has been passed to all devices on the network the cycle begins all over again. When a device gets the privilege it can transmit data if it needs to, or just pass the privilege on to the next device.

Another method is to set a maximum transmit time period. When a device takes control of the transmission medium it can only transmit for a certain period of time, after which it must relinquish control of the network.

The amount of time for a data packet to be communicated between two devices is known as the latency. If the two methods described above are combined, the maximum amount of time it takes to get the opportunity to transmit a data packet is the time it takes for the transmit privilege to complete a cycle around the network. Since the privilege may travel in a defined cycle, and since each device may have only a set amount of time to transmit, the latency is deterministic. Since not every device will necessarily want to transmit during a given cycle of the transmit privilege, the latency will vary from cycle to cycle, but will always be less than a known maximum value.

If many devices are connected to the network the maximum transmit time can be shortened to maintain a certain latency value. If fewer devices are connected to the network the maximum transmit time can be increased and the latency value will remain the same.

While the allocation scheme described above is one way to achieve a bounded, deterministic latency, other schemes also exist.

In most networks, each connected device has its own address. There are two main schemes used by network systems to ensure that transmitted data packets arrive at the right receiving device. In the first, each data packet is addressed to a particular receiving device. In the second, group addresses are used.

In the first scheme each data packet has a destination address field. The transmitting device puts a value equal to the receiving device's address into the destination address field of a data packet, then transmits the packet. The receiving device constantly scans the data packets passing over the network and receives only data packets with its own address. If the transmitting device must send a particular message to several receiving devices, this addressing scheme is inefficient since the same data packets must be sent multiple times to each receiving device. This wastes network bandwidth and slows down all devices on the network.

This approach normally uses robust transport and network protocols such as Transport Control Protocol-/Internet Protocol (TCP/IP) or an International Organization for Standardized (ISO) Open System Interconnection (OSI) Compliant Network and Transport Protocol to provide error handling and packet sequencing in the presence of noise and other data traffic.

The operation of this protocol may also require that a flow control mechanism such as that described in U.S. patent application Ser. No. 452,429, filed Dec. 19, 1989, and assigned to the same entity as the assignee hereof, which is incorporated herein by reference. This patent application describes a dispersed end entity flow control technique for computer networks which can be implemented to manage data flow when the receiving device cannot accept additional data due to excessive demands on its resources.

In a group addressing system there are predefined address values corresponding to different types of data. A transmitting device will decide what type of data it is transmitting, and will put the appropriate group address in a data packet's destination address field. A receiving device looking for a particular type of data scans the destination address field of all the data packets traversing the network and selects only those with the correct group address. Since multiple receiving devices can each receive a single transmission of data packets based on the group address, duplicate transmission of data packets is not necessary. However, group addressing imposes a rigid communications structure on connected devices. The data types must be known to all connected devices, and it is difficult, if not impossible, to change the group addresses. Similarly, it may not be possible to dynamically vary groups from message to message.

In many environments it is desirable to communicate both synchronous and asynchronous signals over the same network medium. Continuous, synchronous signals such as audio and video data must be broken down into data packets at the transmitting end, transmitted across the network, then reassembled into a synchronous signal at the receiving end. In order ensure that synchronous signals appear whole to the user at the receiving end the packets must traverse the network fast enough to be inserted back into the correct position in the outgoing synchronous data stream. In practical terms this means the delay in passing a data packet from one device to another, the latency, must be bounded and deterministic. Many network standards provide this type of environment, but a low latency is essential to proper transmission of synchronous data.

Often a synchronous signal must be sent to more than one receiving device. It is also common for the intended receiving devices to vary from message to message. If the transmitting device uses the addressing method of addressing each data packet to an individual receiving device, it allows the transmitting device to select exactly who will receive the transmission. Unfortunately, precious transmission time is wasted in sending duplicate data packets to multiple devices.

If the group addressing scheme is used the transmitting device loses control over who will receive the message, and the transmitting device is unable to tell individual receiving devices to tune into a certain message. It is impossible to dynamically vary the groups on a message by message basis.

It is accordingly an object of the present invention to provide a novel method and system for transmitting synchronous data between dynamically variable groups over a standard network having deterministic bounded latency.

It is a further object of the present invention to provide a novel method and system for more efficiently using the available bandwidth of a standard network having deterministic, bounded latency during synchronous communications between dynamically variable receiving groups.

These and other objects and advantages of the present invention will be apparent to one skilled in the art from the claims and from the following detailed description when read in conjunction with the appended drawings.

DESCRIPTION OF A PREFERRED EMBODIMENT

Figure 1:
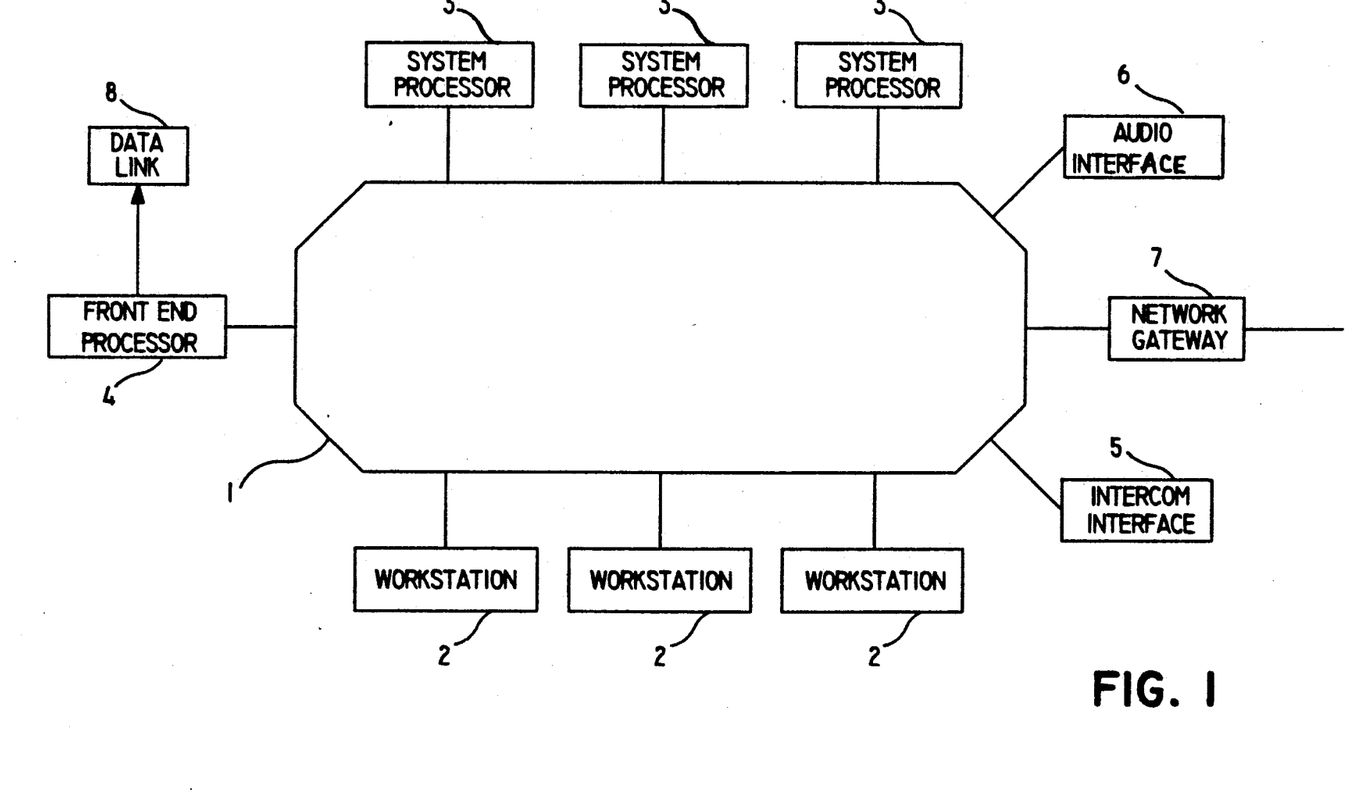
FIG. 1 is a functional block diagram of a typical network in which the method and system of the present invention could be utilized.

A data communications network in which the method and system of the present invention may be used is illustrated in FIG. 1. With reference to FIG. 1, a network transmission medium 1 links all the devices and provides a path for data transfer. The particular types of devices interconnected by the network transmission medium varies widely depending on the function of the network. The devices shown in the network of FIG. 1 are typical but not limiting, as is well known to those skilled in the art.

Various system processors 3 may be connected to the network transmission medium 1 to carry out a variety of functions depending on the environment of the system. The function of a system processor 3 will vary depending upon the data processing needs of the network and could be a recording device, a data storage device, a text editing device, or any other device which produces and/or consumes synchronous and/or asynchronous data signals.

A front end processor 4 may be connected to the network transmission medium 1 to provide an interface between the network and a data link 8. This interface makes it possible for the network to receive data signals from outside sources. The front end processor 4 receives data from the data link 8, and formats the data in packets suitable for transmission over the network transmission medium 1.

An audio interface 6 may be present in the network system to allow exterior devices to exchange audio signal data with devices connected to the network transmission medium 1.

A network gateway 7 may be present in the network system to allow one network system to exchange synchronous and asynchronous data signals with another network system.

An intercom interface 5 may be present in the network system to allow devices connected to the network transmission medium 1 to communicate with an external intercom system.

A variety of network input/output operations can be accomplished by the audio interface 6, the network gateway 7, or the intercom interface 5. The audio interface 6 and the intercom interface 5 both allow devices connected to the network to communicate with external devices using synchronous data signals. Both the audio interface 6 and the intercom interface 5 should be capable of formatting incoming audio signals into standard data packets for transmission over the network and should be capable of taking synchronous signal data packets from the network and converting them to normal audio signals. The network gateway 7 is a conventional method of connecting one network system to another network system, and is typically designed only to pass asynchronous data signals between networks.

A variety of workstations 2 may be connected to the network system, each of which may need to communicate synchronous and asynchronous signals to other devices connected to the network transmission medium 1.

As is further described in detail below, each of the devices attached to the network transmission medium 1 transmits and/or receives data from the medium 1, synchronously and/or asynchronously. The sharing of the resources of the network make efficient use of both the resources of the various devices and of the communications network.

Figure 2:
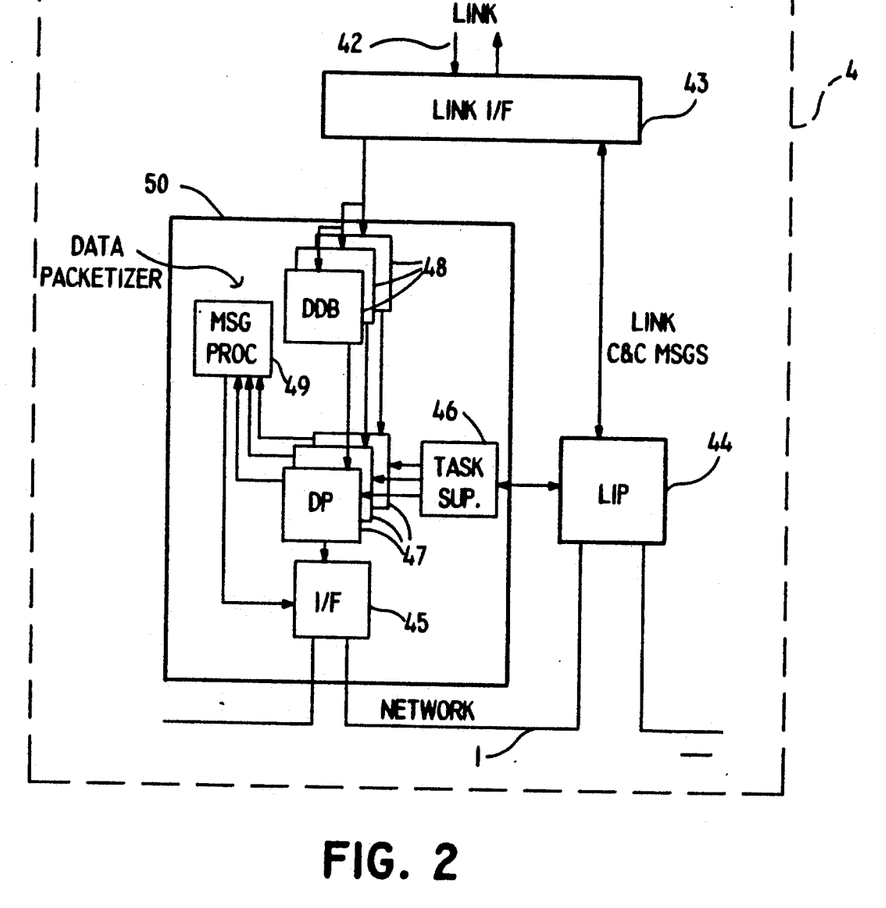
FIG. 2 is a functional block diagram of a data link front end processor which could be used in the system illustrated in FIG. 1.

With reference to FIG. 2, a front end processor 4, which provides an interface between a data link and the network transmission medium is made up of three basic elements, a link interface 43, a link interface processor 44, and a network data packetizer 50.

The link interface 43 contains hardware and software which enables the link interface 43 to distinguish between synchronous and asynchronous signals received via the LINK lines 42. Asynchronous signals are passed by the link interface 43 to the link interface processor 44, while synchronous signals are passed to the network data packetizer 50.

If asynchronous signals received by the link interface processor 44 are received in a form which is compatible with the network the signals may be passed directly to the network through the network's normal protocol. If the asynchronous signals require further processing to be compatible with the network they are passed first to the network data packetizer 50.

Synchronous signals received by the link interface unit 43 are passed to the network data packetizer 50. The synchronous signals are buffered into pages of memory 48 and as the pages of memory become full they are passed to a data packetizer 47. The data packetizer 47 takes the synchronous signals, now in memory 48, and creates data packets, adds the destination address to the data packets and passes the data packets to a network interface 45. The network interface 45 transmits the complete data packets over the network system.

Asynchronous data signals coming from the link interface processor 44 which require additional processing are passed to a task supervisor 46. The task supervisor 46 passes the asynchronous data signals to the data packetizer 47 which places the data into packets and passes the packets to a message processor 49. The message processor 49 takes care of additional message processing functions and passes the asynchronous data packets to the network interface 45. The network interface 45 transmits the asynchronous data packets over the network system.

Figure 3:
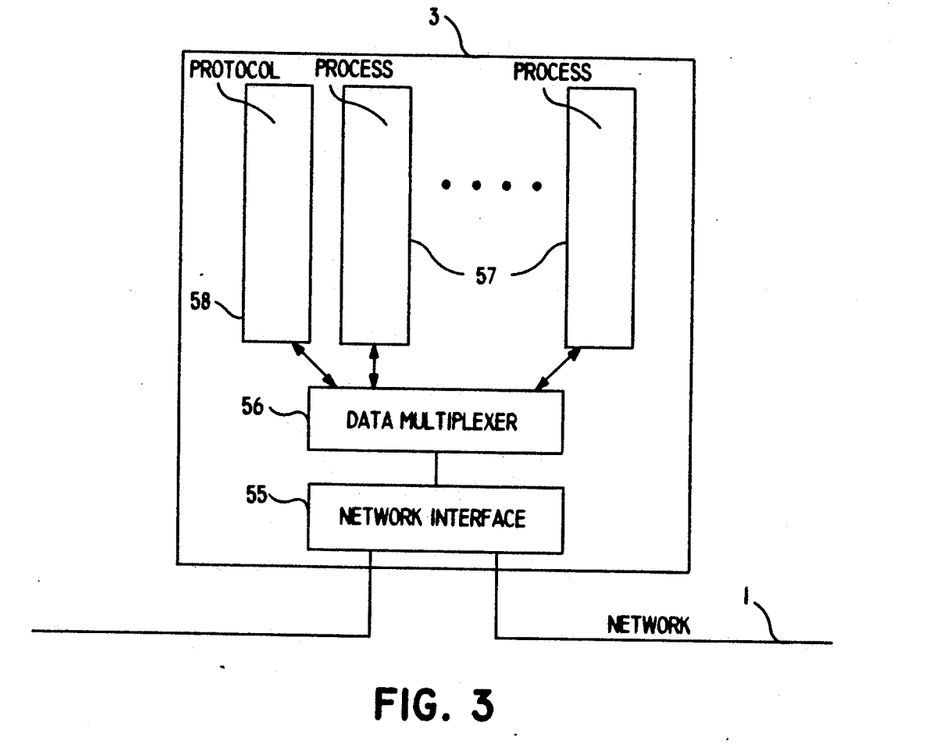
FIG. 3 is a functional block diagram of a typical system processor which could be used in the system illustrated in FIG. 1.

With reference to FIG. 3, a System Processor 3 provides distributed processing elements to support centralized data requirements such as system wide data bases or centralized recording functions. Data is received by the System Processors 3 through a network interface 55. The network interface 55 takes the data received from the network transmission medium 1 and passes it to a data multiplexer 56. The data multiplexer 56 then passes the signals onto various processes 57 within the System Processor 3. A Single System Processor 3 may be capable of supporting multiple processes such as recording functions or database serving functions.

A System Processor 3 may be both a consumer and a producer of synchronous and/or asynchronous data signals. If a System Processor 3 is a producer of synchronous or asynchronous data signals, signals created by the processors 57 would be packetized, then passed to the data multiplexer 56 and from there to the network interface 55. The network interface 55 would transmit the data signals in the form of data packets over the network.

Figure 4:
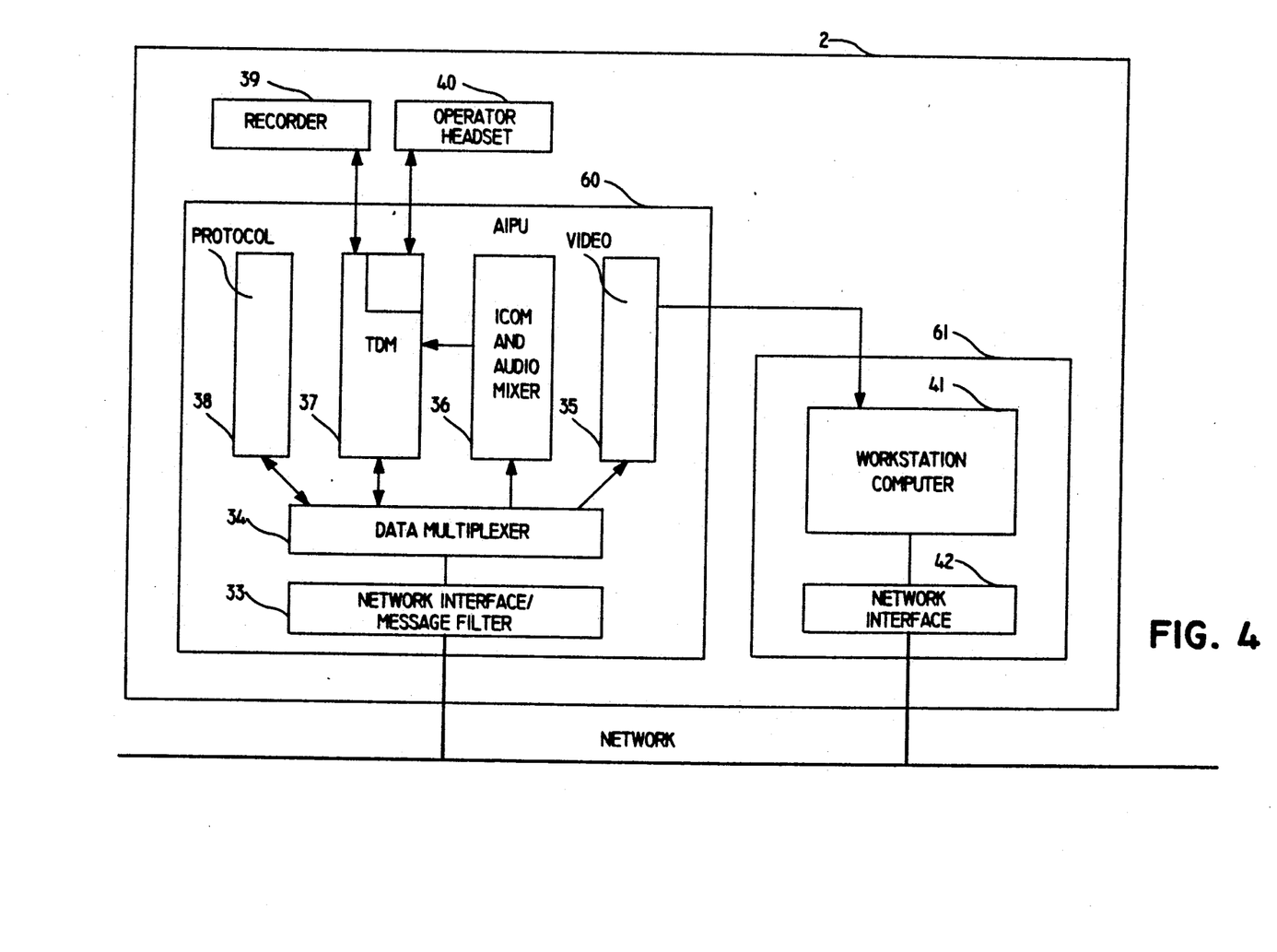
FIG. 4 is a functional block diagram of an integrated workstation which could be used in the system illustrated in FIG. 1.

With reference to FIG. 4, an integrated workstation 2 may receive, process and generate both synchronous and asynchronous data signals. The integrated workstation 2 may serve as the primary man-machine interface for the network system. The integrated workstation is made up of two parts: a conventional workstation 61 which produces and consumes asynchronous data signals, and an auxiliary interface and processing unit 60 which receives and transmits synchronous data signals.

The auxiliary interface and processing unit 60 provides all of the real time processing of synchronous data signals. Synchronous data signals are received from the network by a network interface and message filter 33. The network interface and message filter 33 is capable of scanning each data packet traversing the network and selecting only those data packets with pre-identified destination address field values. The network interface and message filter 33 select those data packets which it is desirable receive and passes the data packets onto a data multiplexer 34. The data multiplexer 34 passes video synchronous signals onto a video processor 35, and passes audio signals onto either an intercom and audio mixer 36 or a time division multiplexer 37. Since synchronous signal data packets may be received out of order, the intercom and audio mixer 36 takes the synchronous data packets and puts them back into the correct temporal order and passes them to the time division multiplexer 37. The time division multiplexer 37 may support industry standard links, such as a DS1 line connecting to a digital recorder or an Integrated Services Digital Network (ISDN) basic rate line (as specified in CCITT standards I.430/I.440/ I.441/I.45-0/I.451) connecting to an operator's head set. Optionally, it may consist of a simple analog to digital, digital to analog convertor. The time division multiplexer 37 passes demultiplexed audio signals to end user devices such as an operators headset 40, or a recording device 39.

Outgoing audio signals, generated by the end user are passed to the time division multiplexer 37. The time division multiplexer 37 takes the audio data and places it into data packets suitable for transmission under the network protocol and passes these data packets to the data multiplexer 34. The data multiplexer passes data packets to the network interface and message filter 33 which then transmits the data packets over the network.

With continued reference to FIG. 4, the work station portion 61, of the Advanced Integrated Workstation 2 sends and receives asynchronous data signals via its own network interface 42. Asynchronous data signals are received from the network over the network interface 42 and are passed onto the workstation computer 41. Outgoing asynchronous data signals are generated by the workstation computer 41 and are passed to the network interface 42 for transmission over the network.

Figure 5:
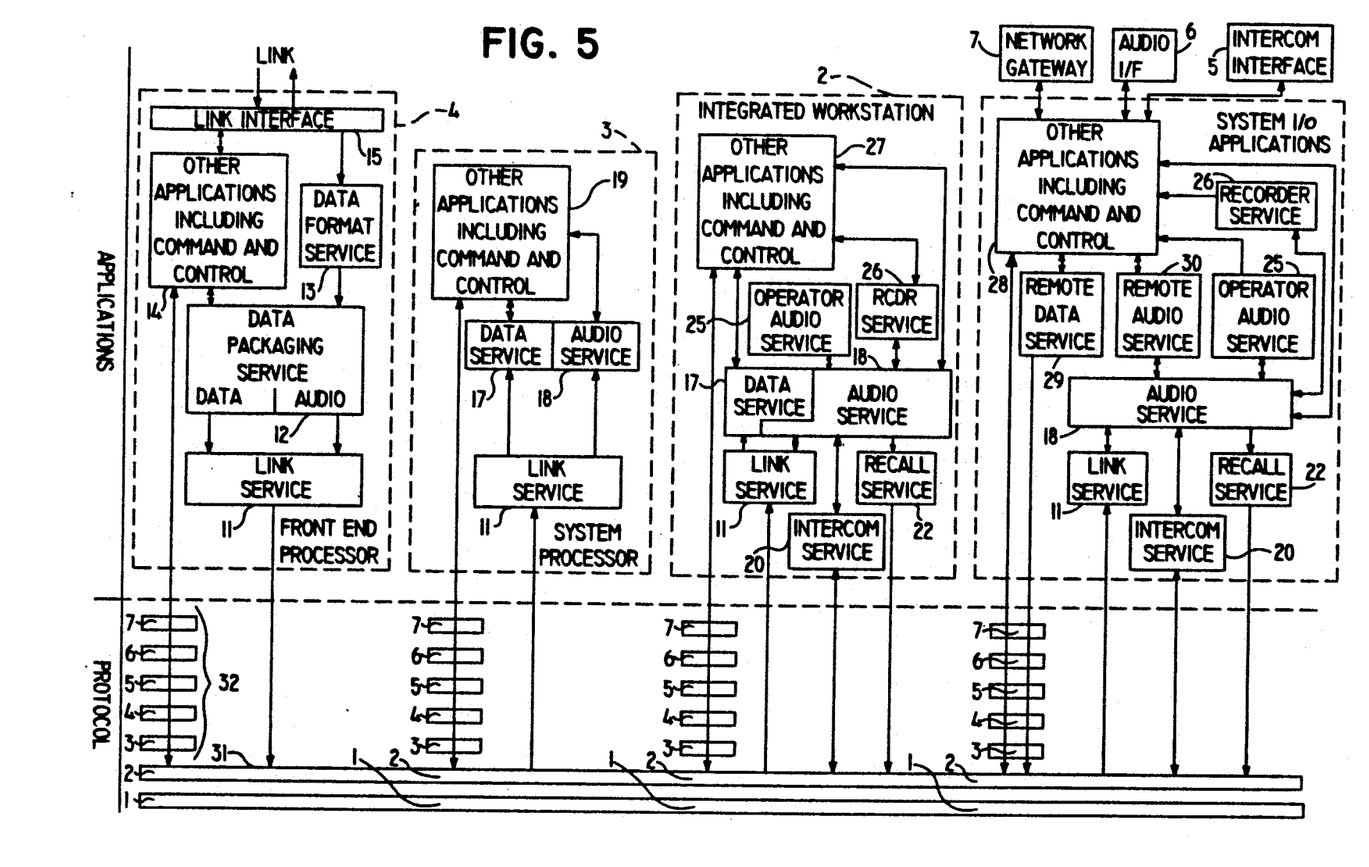
FIG. 5 is a functional block diagram showing typical devices used in a network illustrated in FIG. 1, and illustrating the different paths data can follow in traversing the network.

With reference to FIG. 5, each different type of network system has its own communications protocol. Typically a communications protocol will be composed of several layers, the bottom layers are the actual, physical transmission medium, and the upper layers are data manipulation and data check functions to ensure that data packets passing between devices, are in the correct format and have not been corrupted with data errors during transmission. One type of data network system protocol which is capable of supporting a network system embodying the present invention is the ANSI X3T9.5 fiber data distribution interface and packetized local area network. A network system operating under this standard has a communications protocol which consists of a seven layer stack. The second layer 31 in this system protocol is the actual, physical transmission medium. Layers 3-7 of this communications protocol buffer data packets, prepare data packets for transmission, check data packets for errors which were introduced during transmission and ensure the data packets are in the correct format to be passed onto the end using device.

Above the multi-layer network system protocol rest the various applications interconnected by the network. Typical applications are illustrated in FIG. 5: data link interface 4, system processor 3, integrated workstation 2, network gateway 7, audio interface 6 and intercom interface 5. Each of these applications are illustrative of the types of applications which may be present and the present invention is not intended to be limited to the specific applications illustrated.

With continued reference to FIG. 5, the actual path that a data packet will traverse as it is communicated from one connected device to another connected device is illustrated by the lines connecting the protocol layers to the applications.

Asynchronous signals which are passed between the various connected devices follow the normal transmission path for this type of network system. The data packet is generated by a connected device, is passed to layer 7, then passed down to layer 2 of the network protocol stack where it is transmitted over the actual physical transmission medium to another connected device. Upon receipt at the protocol layer of a connected device, the packet may be accepted, checked for correct format, assembled, and error checked by the various protocol layers before being passed to the application.

Synchronous signal data packets which are generated by a connected device can be passed directly to the second layer of the network protocol stack, bypassing layers 3-7. This saves time which is critical when communicating synchronous data signals.

With continued reference to FIG. 5, a Front End Processor 4 for a data link can take both asynchronous and synchronous data signals from an external link and pass them to a link interface 15. If the received signals are asynchronous data signals, they may be passed directly to the seventh layer of the network protocol stack where they will follow the normal network communications protocol and be transmitted asynchronously over the network.

Synchronous and asynchronous data signals not in the required communications format will be put through a data formatting process where the data is converted into data packets, given an address and passed onto the second layer of the network protocol, which is the actual physical transmission medium.

A System Processor 3 can receive asynchronous signals via the second through seventh layer of the network protocol stack or it can receive synchronous data signals directly from the second layer of the network protocol stack.

An integrated workstation 2 can receive and transmit asynchronous data signals via the normal seven layer protocol stack. It can also receive and transmit synchronous data signals directly to and from the second layer of the network protocol stack.

The various system input/output applications such as the network gateway 7, the audio interface 6 and intercom interface 5 can also communicate using either asynchronous data signals or synchronous data signals. The asynchronous data signals will travel through the normal seven layer network protocol stack and the synchronous data signals will be passed directly to and from the second layer of the network protocol stack.

If one device connected to the network needs to send synchronous data signals to another device connected to the network, it will first communicate using asynchronous data signals. The asynchronous data signals will alert the receiving device that synchronous data will follow and will communicate the transmitting device's address value.

The receiving device will configure its network interface message filter to look for data packets bearing a destination address field value equal to the address of the transmitting device.

The transmitting device will then take its synchronous data and load it into data packets bearing a destination address field value equal to the transmitting device's address. These data packets bearing the synchronous data will then be applied directly to the actual network transmission medium bypassing levels seven through three of the network communications protocol.

The receiving device's network interface message filter will look for and pull these data packets directly into the audio and video processing portions of the connected device, bypassing layers three through seven of the network communications protocol. The data packets will be converted back into a synchronous data stream, and will be presented to the end user.

Figure 6:
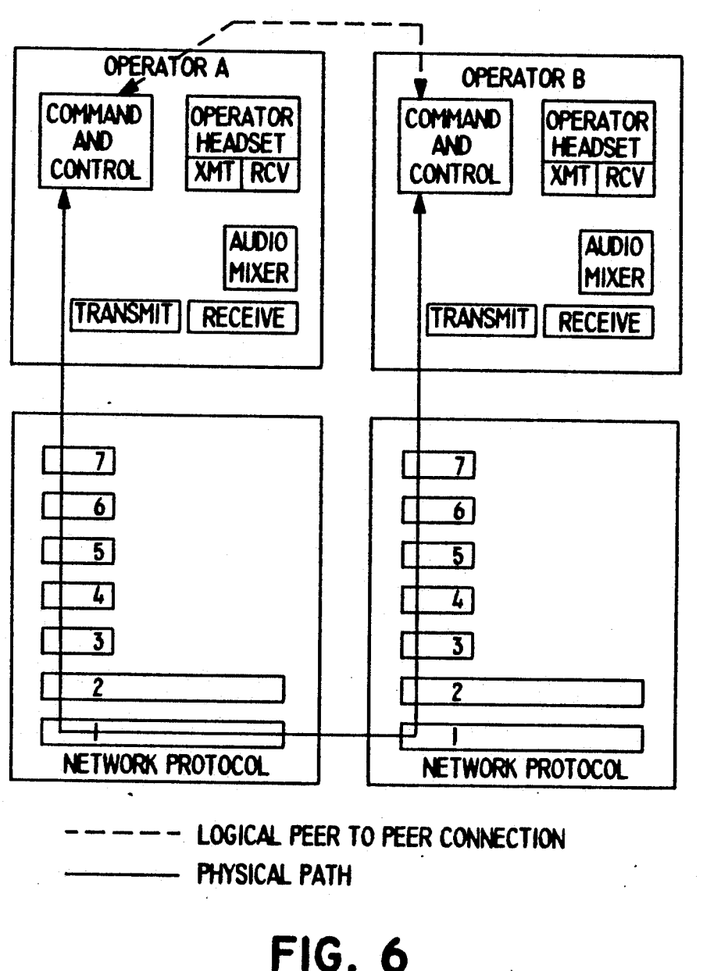
FIG. 6 is a functional block diagram illustrating how two devices connected to a network system embodying the present invention would inform each other of their intent to begin transferring synchronous data.

If synchronous signals must be passed back and forth between two connected devices, i.e., a full duplex circuit, the two devices will first communicate using asynchronous data signals to notify each other of their intent to pass synchronous signals and to exchange their respective address values. This process is illustrated in FIG. 6 and may occur as follows:

Operator A wants to talk to Operator B,
Operator A uses asynchronous protocol to inform Operator B of his intent,
Operator B informs Operator A that he will talk to him,
Operator A tells Operator B that he will transmit on address X,
Operator B tells Operator A that he will transmit on address Y.

Figure 7:
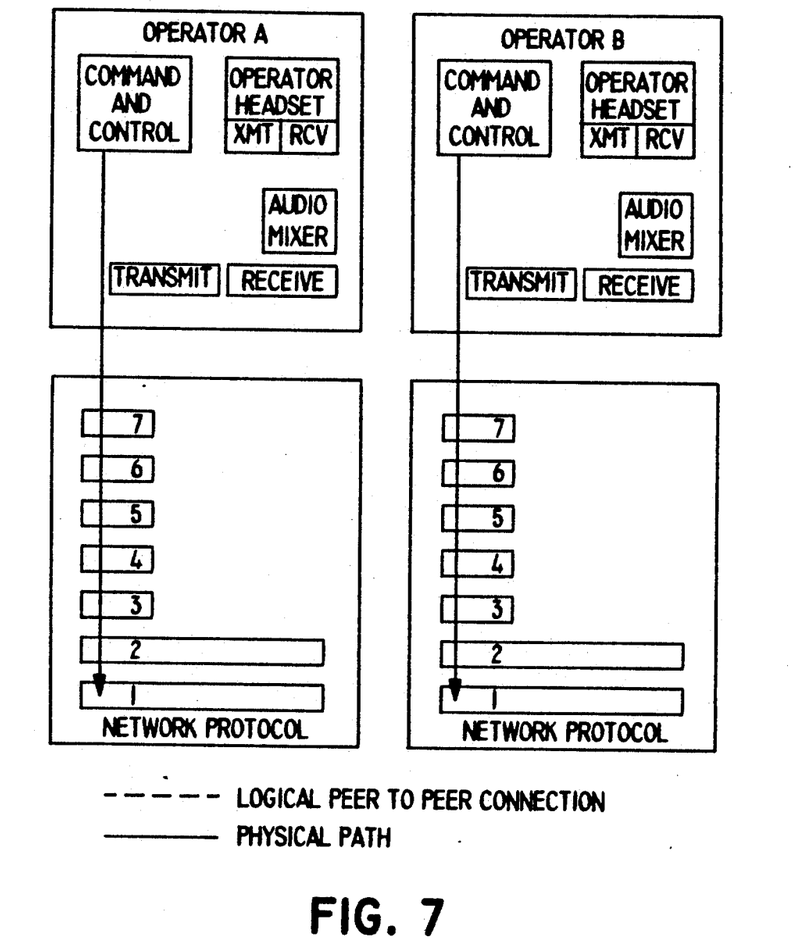
FIG. 7 is a functional block diagram illustrating how two devices connected to a network system embodying the present invention would set up their respective message filters.

Each device will then configure its network interface message filter to receive data packets bearing a destination address field value equal to the address of the other device. This process is illustrated in FIG. 7 and may occur as follows:

Operator A and Operator B setup their network interface message filters to look for certain addresses in the destination address fields of data packets,
Both Operators hear silence since no data has been transmitted yet.

Figure 8:
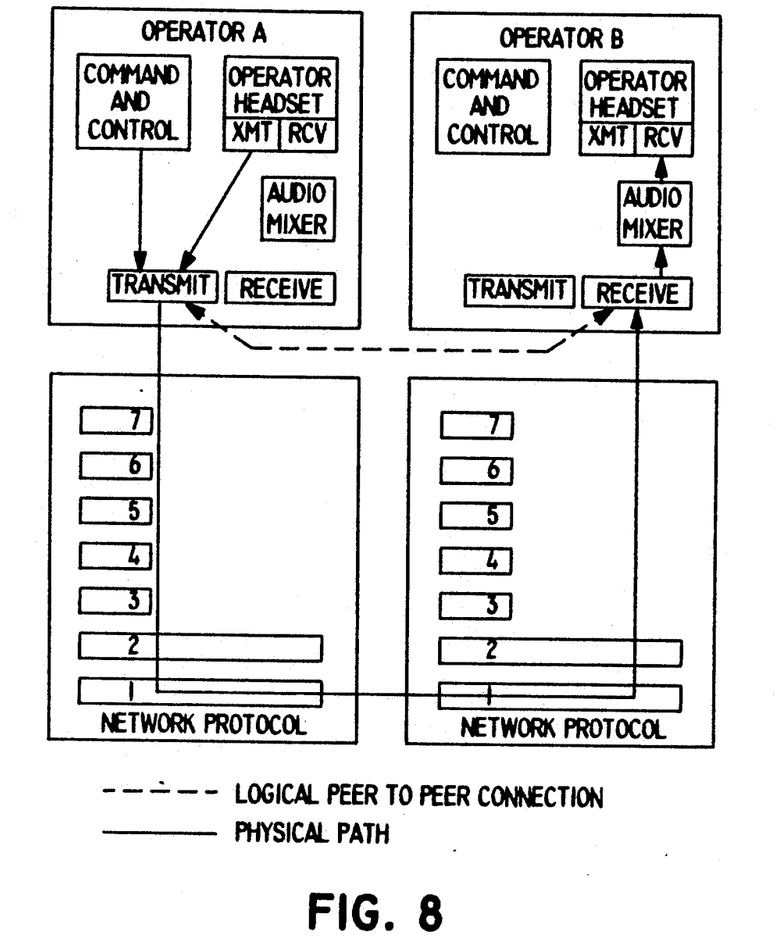
FIG. 8 is a functional block diagram illustrating the transfer of synchronous data between two devices connected to a network embodying the present invention; and, FIG. 9 is a functional block diagram illustrating how two devices connected to a network system embodying the present invention would end the transmission of synchronous data.

When one device wishes to transmit synchronous data, it can convert the synchronous signal into data packets with its own address value in the destination address field and transmit the packets over the network. These packets will be received by the other connected device and will be sent directly from the actual transmission medium to the audio or video processors. This process is illustrated in FIG. 8 and may occur as follows:

Operator A starts transmitting data packets with a destination address field value of X,
Operator B's message filter recognizes data packets with a destination address field value of X and passes the data packets to his audio mixer, which presents the audio signal to Operator B's headset,
Operator A stops transmitting data packets,
Operator B's message filter stops receiving the data packets and Operator B hears silence.

Figure 9:
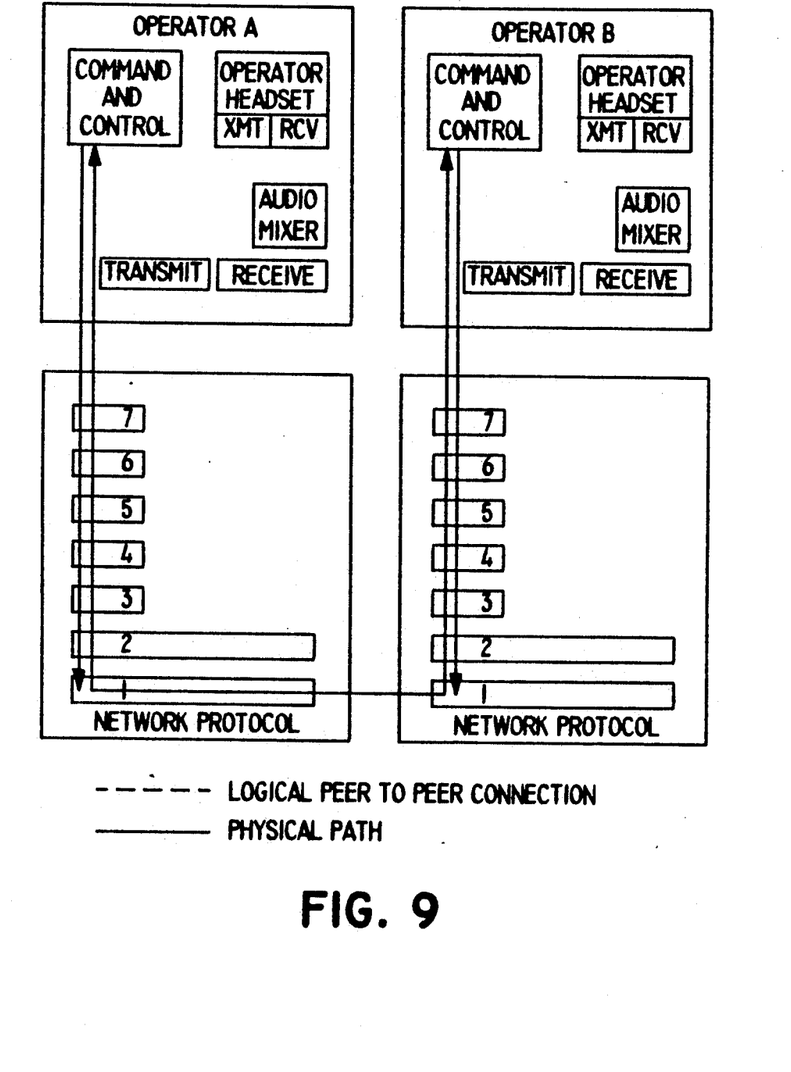

When one of the two devices decides to break the connection it will inform the other device either through the synchronous signal, or via asynchronous signals. Each device will command its network interface message filter to stop receiving data packets bearing the destination address of the other device. This process is illustrated in FIG. 9 and may occur as follows:

Operator A or Operator B wants to end the exchange of synchronous data,
Operator A tells his message filter to stop looking for data packets with a destination address field value of Y,
Operator B tells his message filter to stop looking for data packets with a destination address field value of X.

In both the one way communications setup and in the duplex communications setup, passing the synchronous signal data packets directly from the actual physical transmission medium to the audio or video processors saves valuable time. Since synchronous data signals must traverse the network in time to be reassembled into the correct temporal stream, time lost in sending the data packets through levels three through seven of the traditional network protocol could result in garbled transmissions or lost data.

If one device needs to communicate with two or more connected devices, a communications net can be established. To establish a communications net, the first communications device will send asynchronous data signals to each of the devices it wishes to communicate with. These asynchronous data signals will convey its intent to communicate using synchronous data and will inform the other devices of the first device's address value. Each of the devices which has been contacted will then send its address value to each of the other devices in the communications net. Each device in the communications net will then configure its network interface message filter to look for data packets bearing the address values of each of the other devices in the communications net.

When a device wishes to communicate with the other devices in the net, it will take its synchronous data signal, load it into data packets with a destination address field value equal to the transmitting device's own address, and broadcast these packets over the network. Each of the other devices will receive these data packets and convert them back into a synchronous signal and present it to the end user.

This type of addressing scheme has several advantages over the prior art. Like the group addressing scheme, a signal which needs to be sent to multiple receiving devices need only be sent a single time. Each of the receiving devices will be able to receive the data packet based on the value of the destination address field. Since the devices can communicate using asynchronous data signals prior to transmission of the synchronous signal, each device can be individually notified to look for a particular value in the destination address field. Hence the group of devices receiving a particular synchronous signal can vary from message to message. Since the data packets are passed directly to and from the actual physical transmission medium and bypass layers three through seven of the communications protocol, the synchronous signals are sent as rapidly as possible between the actual devices.

The network interface message filter used in this type of network scheme can utilize many different commercial network interface cards based on a decoding mechanism known as "content addressable memory". These interface cards can sort through large numbers of packets and accept only those with a particular destination address field value. The network interface message filter is set up by commands from the connected devices central processor. These commands tell the network interface message filter which address values to look for in the destination address fields of data packets traversing the network. The addresses which are being filtered for can be changed by another message from the central processor of the connected device. Once the network interface message filter is configured, no other processor intervention is required. This means that synchronous data can be exchanged between connected devices without interfering with the normal asynchronous communications and without interfering with the other processes which are occurring at the particular connected device. Since the arriving synchronous data passes directly to the appropriate synchronous data processor, there is no need to implement a flow control mechanism for synchronous data.

In the foregoing description, certain network communications protocols have been referenced. It is not necessary for any particular communications protocol to be in use in order to practice the invention. The foregoing description is by way of illustration and is not intended to be limiting.

These and other advantages of the present invention will be readily apparent to one skilled in the art from the claims. It should be understood that the foregoing description of the preferred embodiment is illustrative only and that many modifications may be made without departing from the spirit thereof as defined in the claims when accorded a full range of equivalents.

I claim:

1. A data communications system for the transmission and reception of asynchronous and synchronous data signals with a deterministic, bounded latency comprising:

plural communicating devices connected by a common network, each device having an associated address value;

asynchronous data signals passing between two or more of said communicating devices indicating the intent of one of the devices to communicate synchronous data signals and informing the receiving communicating device of the address value of the transmitting communicating device; said synchronous data signals being transmitted over the network in one or more data packets, each packet having a destination address field and having the value stored in said address field equal to the address value of the transmitting communicating device;

one or more of said receiving communicating devices receiving the synchronous data signal sent by the transmitting communicating device, each receiving communicating device having a message filter which accepts only data packets having a destination address field value equal to the address value of the transmitting communicating device; said message filter passing the selected data packets to a synchronous signal decoder/mixer which reassembles the received data packets into a synchronous data signal.

2. The system of claim 1 wherein two communicating devices effect full duplex communication between them of synchronous data signals.

3. The system of claim 1 wherein one or more of said communicating devices are able to receive simultaneously the synchronous data signal transmissions from two or more communicating devices such that a communications net of synchronous data signals can be maintained between three or more communicating devices.

4. The system of claim 1 wherein the set of address values within the message filter of a first communicating device can be changed in response to a command from a central processor portion of the first communicating device and in response to an asynchronous data signal from a second communicating device so that the first communicating device changes the set of transmitting communicating devices from which synchronous data signals will be received.

5. The system of claim 1 wherein the message filter is connected directly to the network transmission medium; and wherein received data packets bearing pre-identified destination address field values are passed directly to the synchronous signal decoder/mixer, thereby bypassing any error checking or signal processing which might normally occur according to the communications protocol in use by the system.

6. The system of claim 1, wherein a communicating device is able to invoke a flow control mechanism to control the flow of asychronous data signals while allowing synchronous data signals to flow unimpeded by asynchronous data signal congestion.

7. In a data communications system comprising plural communicating devices interconnected by a common network having deterministic bounded latency, each communicating device having an associated address value, a method of communicating synchronous and asynchronous data comprising the steps of;

1) communicating asynchronous data signals between connected devices in accordance with the communications protocol in use by the system;
   2) communicating asynchronous link signals to indicate the intent of one of the devices to communicate synchronous data signals and to inform the receiving communicating devices of the address value of the transmitting communicating device;
   3) configuring by the receiving device of a message filter to accept data packets with a destination address field value equal to the address of the transmitting device;
   4) transmitting synchronous data signals by the transmitting device over the network in one or more data packets, each packet having a destination address field and having the value stored in said destination address field equal to the address value of the transmitting communicating device; and
   5) receiving by one or more of said receiving communicating devices the synchronous data signal sent by the transmitting communicating device, the message filter in the receiving device accepting the selected data packets to reassemble the received data packets into a synchronous data signal.

* * * * *